US010098194B1

(12) United States Patent
Xiong

(10) Patent No.: US 10,098,194 B1
(45) Date of Patent: Oct. 9, 2018

(54) CURRENT AND VOLTAGE CONTROL CIRCUIT AND METHOD FOR A CLASS II LED DRIVER

(71) Applicant: Universal Lighting Technologies, Inc., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 15/695,559

(22) Filed: Sep. 5, 2017

Related U.S. Application Data

(60) Provisional application No. 62/383,821, filed on Sep. 6, 2016.

(51) Int. Cl.
*H05B 37/02* (2006.01)
*H05B 33/08* (2006.01)

(52) U.S. Cl.
CPC ..... *H05B 33/0821* (2013.01); *H05B 33/0833* (2013.01); *H05B 33/0842* (2013.01)

(58) Field of Classification Search
CPC ............ H05B 33/0821; H05B 33/0833; H05B 33/0842
See application file for complete search history.

(56) References Cited

U.S. PATENT DOCUMENTS

| 6,349,045 | B1 * | 2/2002 | Kogel | ............... | H02M 3/33523 |
| | | | | | 363/20 |
| 6,577,512 | B2 * | 6/2003 | Tripathi | ............. | H05B 33/0815 |
| | | | | | 363/21.15 |
| 6,775,164 | B2 * | 8/2004 | Wong | ...................... | H02M 1/36 |
| | | | | | 363/147 |
| 8,193,738 | B2 * | 6/2012 | Chu | ................... | H05B 33/0815 |
| | | | | | 315/307 |
| 8,803,437 | B2 * | 8/2014 | Hsieh | ................. | H05B 33/0851 |
| | | | | | 315/209 R |
| 2009/0315480 | A1 * | 12/2009 | Yan | ..................... | H05B 33/0815 |
| | | | | | 315/297 |
| 2011/0157936 | A1 * | 6/2011 | Huynh | ............... | H02M 3/33507 |
| | | | | | 363/78 |
| 2011/0199793 | A1 * | 8/2011 | Kuang | ............... | H05B 33/0815 |
| | | | | | 363/21.13 |

(Continued)

*Primary Examiner* — Alexander H Taningco
*Assistant Examiner* — Kurtis R Bahr
(74) *Attorney, Agent, or Firm* — Patterson Intellectual Property Law, P.C.; Gary L. Montle

(57) ABSTRACT

A driver circuit includes a combined current and voltage control circuit for driving a light emitting diode (LED) load. The driver circuit includes an isolation transformer having primary, secondary, and auxiliary windings. A primary side circuit is coupled to the primary winding and includes a power factor controller and a switch. The power factor controller controls an output current to the LED load by controlling an operational state of the switch. A secondary side circuit is coupled to the secondary winding. The secondary side circuit includes a proportional and integration (PI) control portion which outputs a control signal. A combined voltage and current control circuit is coupled to the auxiliary winding and includes an optocoupler coupled to the power factor controller and to the PI control section. The combined voltage and current control circuit transmits a control signal from the PI control section to the power factor controller.

14 Claims, 3 Drawing Sheets

(56) References Cited

U.S. PATENT DOCUMENTS

| | | | |
|---|---|---|---|
| 2012/0298890 A1* | 11/2012 | Adiga-Manoor | H03K 17/16 250/551 |
| 2012/0314456 A1* | 12/2012 | Lanni | H02M 1/4258 363/21.02 |
| 2016/0322834 A1* | 11/2016 | Carpenter, Jr. | H02J 7/007 |
| 2016/0373011 A1* | 12/2016 | Kawashima | H02M 3/33507 |

* cited by examiner

US 10,098,194 B1

CURRENT AND VOLTAGE CONTROL CIRCUIT AND METHOD FOR A CLASS II LED DRIVER

CROSS-REFERENCES TO RELATED APPLICATIONS

This application claims priority to and benefit of U.S. Provisional Patent Application No. 62/383,821, dated Sep. 6, 2016, entitled "Current and Voltage Control Circuit and Method for a Class II LED Driver," and which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to current and voltage control in flyback converters. More particularly, the present invention relates to combined current and voltage control for a light emitting diode (LED) driver, a driver circuit implementing combined current and voltage control for an LED driver, and methods of use.

LED lighting is growing in popularity due to the decreasing costs of its implementation and relatively long life compared to incandescent lighting and fluorescent lighting. LED lighting can also be dimmed without impairing the useful life of the LED light source.

A typical LED driver is required to have a high power factor, provide class II isolation, and provide both tight secondary voltage control and constant current control. FIG. 1 illustrates a related art flyback converter which is commonly used for this type of application because it can easily realize power factor correction, create isolation, and provide accurate output current and voltage control.

However, class II isolation current and voltage control is not easy to implement using the flyback converter of FIG. 1. Two opto-couplers must typically be used to implement both of voltage and current control, as required.

The LED driver 100 includes a primary side 110, a secondary side 120, a current control section 130, and a voltage control section 140. In the flyback converter 100 of FIG. 1, the load (i.e., LEDs) is on the secondary side 120 with secondary ground GND_S. The primary side 110 has its own ground, primary ground GND_P. An input voltage V1 is provided by an input voltage source. Diodes D1-D4 are the input rectifier diodes that rectify an alternating current (AC) input to a direct current (DC) input voltage, as supplied to the flyback converter 100.

Transformer T1 includes a primary winding T1_P, a secondary winding T1_S, and an auxiliary winding T1_AUX. Transformer T1 is a flyback transformer that helps to provide class II isolation and to provide power conversion. A power factor control integrated circuit (IC) 112 (e.g., an L6562 Transition-mode power factor correction (PFC) controller from STMicroelectronics) is used to control the switching element Q1 via the gate driver output signal GD. The power factor control IC 112 receives a feedback signal from the secondary side 120 using the optocoupler OPTO1 of the current control section 130 and the optocoupler OPTO2 of the voltage control section 140, which are respectively configured to perform current and voltage control. In one exemplary embodiment, the feedback signal is received at an inverting input pin INV of the power factor control IC 112. The auxiliary winding T1_AUX is used to control the zero-crossing detection (ZCD) turn-on switch for Q1.

The secondary side 120 includes portions of two control loops, a current control loop and a voltage control loop. A voltage sensing signal is sensed at a voltage divider formed by resistors R1 and R2. Operational amplifiers OPAMP1 and OPAMP3 provide proportional and integral (PI) control. The output sensed voltage V_sense of the voltage control loop is provided to an input side of an opto-coupler OPTO2 to be relayed to primary side 110 for use by the power factor control IC 112 (e.g., via the INV pin of the power factor control IC 112).

A current sensing signal is obtained at the secondary side 120 using current sensing resistor R_I_sense. Operational amplifier OPAMP1 amplifies the small current sensing signal and feeds the sensed signal back to a PI section loop formed using operational amplifier OPAMP2. The output of the PI loop from OPAMP2 then drives Optocoupler OPTO1 to pass the control signal from secondary side 120 to primary side 110 for current control. The reference current I_ref received by the power factor control IC 112 corresponds to the reference voltage for the current setting used by the PI loop.

The signal received at the INV pin of the power factor control IC 112 of the primary side 110 is used by the power factor control IC 112 to regulate the output current and voltage according to the signal fed back from optocouplers OPTO1 and OPTO2. A voltage control (V_ctl control) section is typically used for voltage control. The power factor control IC 112 also controls the switch Q1 to force the input current received at the secondary side 120 to follow the input voltage V1 waveform to achieve a high power factor while maintaining target output current and voltage settings.

Traditional current and voltage control methods such as those implemented via the system illustrated in FIG. 1 have at least two major drawbacks: (1) bulky designs which are not cost effective because voltage and current loops are separated; and (2) slow performance associated with the voltage loop due to the propagation delay of opto-couplers and the voltage control section.

BRIEF SUMMARY OF THE INVENTION

It is desirable to consolidate voltage and current control loops to reduce the size and cost of the total product, and also to speed up the voltage control loop to reduce the response time of voltage control.

One object of the systems and methods disclosed herein is to provide a driver circuit having a combined current and voltage control circuit for driving a light emitting diode (LED) load. The driver circuit includes an isolation transformer having a primary winding, a secondary winding, and an auxiliary winding. The driver circuit also includes a primary side circuit coupled to the primary winding of the isolation circuit, the primary side circuit having a power factor controller and a switch, the power factor controller controlling an output current to the LED load by controlling an operational state of the switch. The driver circuit further includes a secondary side circuit coupled to the secondary winding, the secondary side circuit having a proportional and integration (PI) control portion which outputs a control signal. The secondary side circuit is used to drive the LED load. The driver circuit includes a combined voltage and current control circuit coupled to the auxiliary winding. The combined voltage and current control circuit includes an optocoupler coupled to the power factor controller and to the PI control section. The combined voltage and current control circuit is configured to transmit a control signal from the PI control section to the power factor controller.

The power factor controller may include a zero-cross detection pin coupled to a terminal of the auxiliary winding. The power factor controller may control operation of the switch based upon at least one signal received at the zero-cross detection pin.

The power factor controller may include a primary side pin. The optocoupler is coupled to the power factor controller via the primary side pin. The power factor controller is configured to regulate an output current and an output voltage to the LED load.

The combined voltage and current control circuit may include a voltage feedback resistor group having a first divider formed by a first and a second dividing resistor, and having a second divider formed by the optocoupler and a third dividing resistor.

The optocoupler may be configured with an emitter resistance which varies between zero resistance and infinite resistance during operation. The combined voltage and current control circuit may transmit a current control signal to the power factor controller during operation, at least in part according to the emitter resistance.

The PI control section may compare a sensed current at the secondary side circuit, may compare the sensed current to a reference current, and may provide a corresponding output voltage to the optocoupler.

The emitter resistance of the optocoupler may decrease as a current passing through a diode side of the optocoupler increases when the sensed current is less than the reference current. The power factor controller may increase the output current provided to the LED load responsive to the decreased emitter resistance.

The emitter resistance of the optocoupler may increase as a current passing through a diode side of the optocoupler decreases when the sensed current is greater than the reference current. The power factor controller may decrease the output current provided to the LED load responsive to the increased emitter resistance.

The secondary side circuit may further include a current sensing resistor and an operational amplifier, with the current sensing resistor coupled to the operational amplifier and configured to sense a real current associated with the secondary side circuit. The operational amplifier may amplify the real current and provide the amplified real current to the PI control section.

Another object of the systems and methods disclosed herein is to provide a method for combined current and voltage control in a light emitting diode (LED) driver circuit for driving an LED load, the LED driver circuit including an isolation transformer having a primary winding, a secondary winding, and an auxiliary winding, the isolation transformer providing isolation to a primary side circuit, a secondary side circuit, and a combined voltage and current control circuit. The method begins by obtaining a real current value at the secondary side circuit, the real current value associated with an output current of the LED driver circuit. The real current value is compared to a reference current value and a control signal is generated. An operating state of an optocoupler is selectively controlled based on the control signal, with the selectively controlling including adjusting an emitter resistance of the optocoupler. A resistance value of a voltage feedback resistor group is modified based upon the adjusted resistance of the optocoupler. A control voltage is provided to a controller of the primary side circuit based at least in part upon a voltage of the voltage feedback resistor group. The output current of the LED driver circuit is then selectively adjusted based at least in part upon the control voltage.

An emitter resistance of the optocoupler may decrease as an optocoupler current passing through a diode side of the optocoupler increases when the real current value is less than the reference current value, and the output current of the LED driver circuit may increase responsive to the decreased emitter resistance.

An emitter resistance of the optocoupler may increase as an optocoupler current passing through a diode side of the optocoupler decreases when the real current value is greater than the reference current value, and the output current of the LED driver circuit may decrease responsive to the increased emitter resistance.

At least one of a maximum and a minimum voltage output of the LED driver circuit may be controlled based, at least in part, upon a parameter associated with the voltage feedback resistor group and an internal reference voltage of a power factor controller of the primary side circuit.

A further object of the systems and methods disclosed herein is to provide a combined current and voltage control circuit coupled to an auxiliary winding of an isolation transformer for providing light emitting diode (LED) driver output control. The combined current and voltage control circuit includes a diode coupled to the auxiliary winding at an anode thereof, a filtering capacitor coupled to a cathode of the diode and to ground, an optocoupler having a diode side and a phototransistor side, the optocoupler configured to receive an input control signal at the diode side and to selectively transmit a driver control signal to the phototransistor side, and a voltage feedback resistor group coupled to the diode and to the filtering capacitor, the voltage feedback resistor group having a first divider formed by a first and a second dividing resistor, and having a second divider formed by the optocoupler and a third dividing resistor.

The combined current and voltage control circuit may output a control signal obtained between the collector of the optocoupler and an intersection between the first and second dividing resistors.

The optocoupler may have an emitter resistance configured to vary between zero resistance and infinite resistance during operation, and the combined voltage and current control circuit may be output a current control signal at least in part according to the emitter resistance.

The emitter resistance of the optocoupler may decrease as a current passing through the diode side of the optocoupler increases. The emitter resistance of the optocoupler is configured to increase as a current passing through a diode side of the optocoupler decreases.

The combined current and voltage may include a current control section having the optocoupler, a primary grounding resistor coupleable to the emitter of the optocoupler at the phototransistor side thereof and to a ground associated with the primary winding, and a secondary grounding resistor coupleable to a cathode of the diode side of the optocoupler and to a ground associated with the secondary winding. The combined current and voltage control circuit may further include a voltage control section having the auxiliary winding, a zero-cross detection output, an auxiliary diode coupled to the auxiliary winding at an anode thereof, a filtering capacitor coupled to a cathode of the auxiliary diode and to a ground associated with the primary winding, and the first and second dividing resistors.

The auxiliary winding may be tightly coupled to the secondary winding such that a voltage across the auxiliary winding matches that across the secondary winding. The voltage across the auxiliary winding may be output by the combined current and voltage control circuit for providing maximum voltage control for an LED driver coupled to the primary winding.

Numerous other objects, features, and advantages of the present invention will be readily apparent to those skilled in the art upon a reading of the following disclosure when taken in conjunction with the accompanying drawings.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Figure 2:
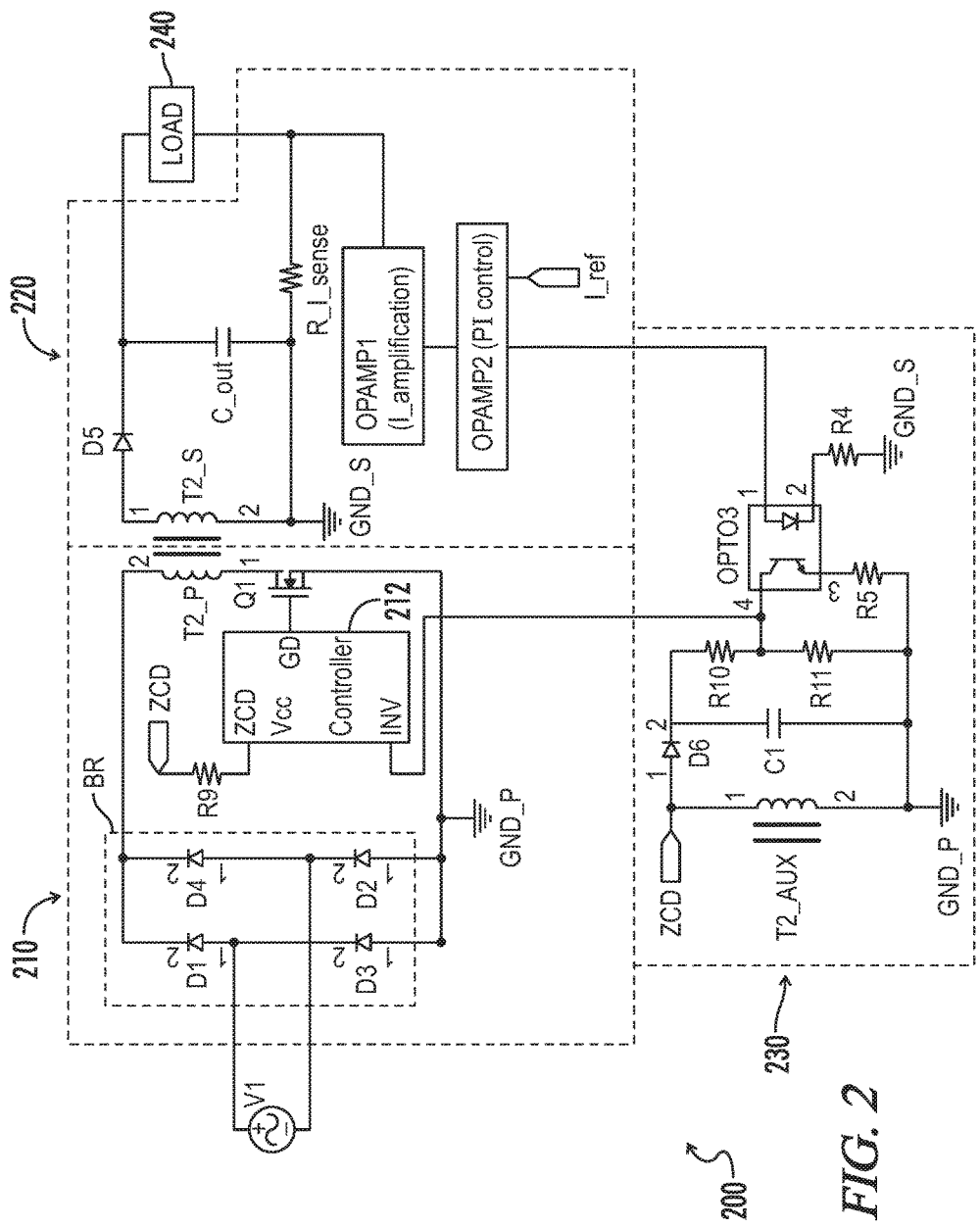
FIG. 2 illustrates an exemplary driver circuit having consolidated voltage and current control loop for flyback converter according to aspects of the present disclosure.
Figure 3:
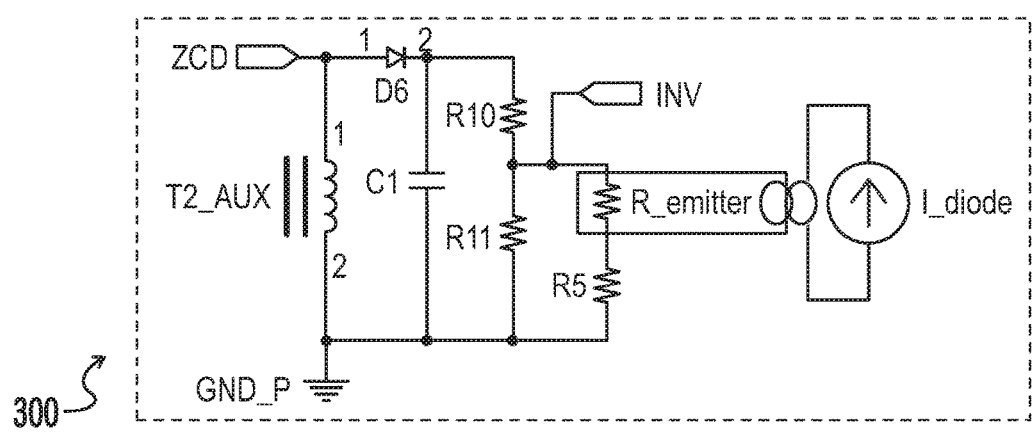
FIG. 3 illustrates an exemplary embodiment of a current-controlled voltage divider for sensing and controlling an output voltage according to aspects of the present disclosure.

Referring generally to FIGS. 2-3, exemplary light emitting diode (LED) drivers, flyback converter configurations, lighting fixtures, and associated methods are now illustrated in greater detail. Where the various figures may describe embodiments sharing various common elements and features with other embodiments, similar elements and features are given the same reference numerals and redundant description thereof may be omitted below.

FIG. 2 illustrates an exemplary driver circuit 200 having consolidated voltage and current control loop for a flyback converter according to aspects of the present disclosure. The driver circuit 200 (e.g., flyback converter) includes a primary side circuit 210, a secondary side circuit 220, and a combined current and voltage control loop circuit 230. The primary side circuit 210, the secondary side circuit 220, and the combined current and voltage control loop circuit 230 may be isolated from one another by an isolation transformer T2. The isolation transformer T2 may include a primary winding T2_P, a secondary winding T2_S, and an auxiliary winding T2_AUX. Each of the primary winding T2_P, the secondary winding T2_S, and the auxiliary winding T2_AUX have first and second terminals, for example to electronically couple to one or more components of the driver circuit 200.

The primary side circuit 210 includes one or more of an input voltage source V1, a rectifying diode bridge BR comprising rectifying diodes D1, D2, D3, and D4, a current limiting resistor R9, a switching element Q1, and a power factor controller 212. In one exemplary embodiment, the power factor controller may be an integrated circuit (IC) such as an L6562 Transition-mode PFC controller from STMicroelectronics. The input voltage source V1 is coupled to the bridge rectifier BR. In one exemplary embodiment, a first terminal of the input voltage source is coupled to the bridge rectifier BR between the anode of rectifying diode D1 and the cathode of rectifying diode D3, while a second terminal of the input voltage source V1 is coupled to the bridge rectifier BR between the anode of rectifying diode D4 and the cathode of rectifying diode D2. An output of the bridge rectifier BR is coupled to the second side of the primary winding T2_P (e.g., via the cathodes of rectifying diodes D1 and D4). The bridge rectifier BR is further coupled to primary side ground GND_P (e.g., via the anodes of rectifying diodes D2 and D3).

The first side of the primary winding T2_P is coupled to the switch Q1 (e.g., at a drain thereof). The gate of the switch Q1 is coupled to the power factor controller 212. The power factor controller 212 may also control the switch Q1 to force the input current received at the secondary side circuit 220 to follow the input voltage V1 waveform to achieve a high power factor while maintaining target output current and voltage settings. A first end of a current limiting resistor R8 is coupled to a ZCD pin of the power factor controller 212. The opposite end of the current limiting resistor R8 is coupled to the combined current and voltage control loop circuit 230. The inverting input pin INV of the power factor controller 212 is also coupled to the combined current and voltage control loop circuit 230. The switch Q1 is coupled to the primary side ground GND_P (e.g., at a source thereof). The power factor controller 212 may be configured to internally set a reference voltage V_ref_inv.

The secondary side circuit 220 of the driver circuit 200 illustrated in the exemplary embodiment of FIG. 2 includes the secondary winding T2_S, diode D5, output capacitor C_out, current sensing resistor R_I_sense, and operational amplifiers OPAMP1 and OPAMP2. The anode of the diode D5 may be coupled to the first terminal of the secondary winding T2_S. The second terminal of the secondary winding may be coupled to the secondary ground GND_S. The cathode of the diode D5 may be coupled to the output capacitor C_out at a first side of thereof and may be further coupled to a load 240 external to the secondary side circuit 220. The load 240 may be one or more LEDs in various embodiments. The load 240 may be external to the driver circuit 200, may be a part of the driver circuit 200, or any combination thereof without departing from the spirit and the scope of the present disclosure. The secondary side circuit 220 of the driver circuit 200 may be configured to provide at least one of a controlled load voltage and/or a controlled load current to the load 240 during operation.

The second side of the output capacitor C_out is coupled to the secondary side ground GND_S and to the current sensing resistor R_I_sense. The current sensing resistor R_I_sense is further coupled to the operational amplifier OPAMP1. Operational amplifier OPAMP1 amplifies the current sensing signal and feeds the sensed signal back to a PI control loop formed using operational amplifier OPAMP2. The output of the PI loop from OPAMP2 is coupled to the combined current and voltage control loop circuit 230.

The combined current and voltage control loop circuit 230 includes one or more of: an auxiliary winding T2_AUX, a diode D6, a filtering capacitor C1, a voltage divider across resistors R10 and R11, an optocoupler OPTO3, a resistor R5, and a resistor R4. The first terminal of the auxiliary winding T2_AUX may be coupled to the anode of the diode D6. The current limiting resistor R9 of the primary side circuit may be coupled between the first terminal of the auxiliary winding T2_AUX and the anode of the diode D6 and may correspond to a ZCD signal received at the ZCD pin of the power factor controller 212. The cathode of the diode D6 may be coupled to the filtering capacitor C1 and to a first side of the resistor R10. The second side of the resistor R10 may be coupled to a first end of the resistor R11, to the INV pin of the power factor controller 212, and to the optocoupler OPTO3 at a phototransistor side thereof. A resistor R5 may be coupled between the phototransistor side of the optocoupler OPTO3 and the primary side ground GND_P. The second terminal of the auxiliary winding T2_AUX, a second end of the resistor R11, and the filtering capacitor C1 may be further coupled to the primary side ground GND_P.

The output of the OPAMP2 of the secondary side circuit 220 is coupled to an anode of the LED side of the optocoupler OPTO3. The cathode of the LED side of the optocoupler OPTO3 is coupled to a resistor R4 which is further coupled to the secondary side ground GND_S.

The auxiliary winding T2_AUX may be used for both voltage control and current control. The auxiliary winding T2_AUX is designed to be tightly coupled with secondary winding T2_S in one exemplary embodiment such that the voltage across T2_AUX will follow the voltage across T2_S, output voltage. The voltage may then be rectified by diode D3 and filtered out by the filtering capacitor C1 such that the voltage across the filtering capacitor C1 of the combined current and voltage control loop circuit 230 will follow the output voltage across the output capacitor C_out of the secondary side 220 very closely. The voltage divider provided by resistors R10 and R11 may be configured to set a minimum voltage that the flyback converter of the driver circuit 200 can output to the load 240 without any feedback loop signal. The minimum output voltage is therefore defined according to equation (1):

$$V\_out\_min = V\_ref\_inv \times \frac{R11 + R10}{R11} \qquad \text{Eq. (1)}$$

The maximum voltage may be defined by equation (2) when the optocoupler OPTO3 emitter (e.g., phototransistor side corresponding to pins 4 and 3) is completely shorted:

$$V\_out\_max = V\_ref\_inv \times \frac{\frac{R11 \times R5}{R11 + R5} + R10}{\frac{R11 \times R5}{R11 + R5}} \qquad \text{Eq. (2)}$$

Figure 1:
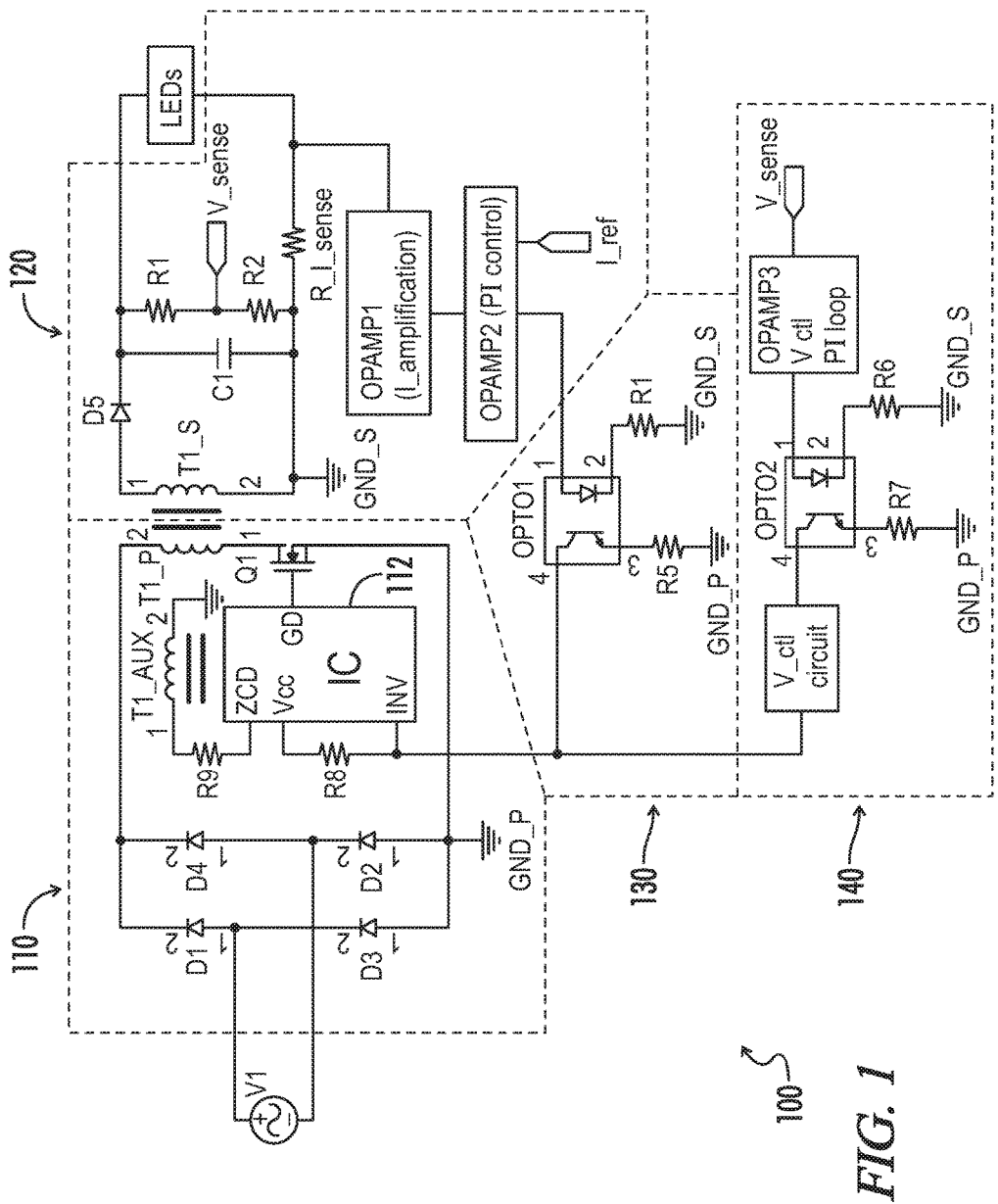
FIG. 1 illustrates a traditional flyback converter configuration having separate voltage and current control loops.

As shown by equations (1) and (2), the voltage range from V_out_min to V_out_max can be clamped without requiring a voltage control loop by using the auxiliary winding T2_AUX corresponding to the ZCD pin of the power factor controller 212. Since no control loop or optocoupler are used in the embodiment illustrated in FIG. 2, the propagation delay is minimized such that the voltage control response is very fast compared to the system illustrated in FIG. 1.

FIG. 3 illustrates an exemplary embodiment of a current-controlled voltage divider for sensing and controlling an output voltage according to aspects of the present disclosure. The current loop of FIG. 3 is similar to that shown in FIG. 1. The current output by PI control of OPAMP2 drives OPTO3's primary diode side and the secondary side current or impedance (of the emitter), R_emitter, is configured to change with the primary current. Practically speaking, the emitter of OPTO3 can be treated as a current controlled resistor, which is connected at least in part using the resistor R5. As such, it can be seen that current loop may be configured to directly control the resistance of the low side of feedback voltage divider, as shown in FIG. 3.

As shown in FIG. 3 the high side of the sensing voltage divider is the resistor R10. The low side has the resistor R11 in parallel with the resistor R5 in series with the emitter impedance R_emitter. The resistance of R_emitter may be configured to change between no resistance to infinite resistance (e.g., when the emitter is open). Thus, resistance of the low side of the voltage divider can vary between: R11 (when R_emitter is infinite) and R11*R5/(R11+R5) (when R_emitter is 0). When low side impedance of the voltage divider is at a minimum, the output voltage will be controlled at a maximum (e.g., according to equation 2, above). When low side impedance of the voltage divider is at a maximum, the output voltage will be controlled at a minimum (e.g., according to equation 1, above).

When the real current, I_LED, is less than the current reference, I_ref, in the PI loop, the output voltage of the PI loop may be configured to increase such that the current going through diode side of the optocoupler OPTO3 and the resistor R4 will increase, as well as the emitter current. When more current goes through the emitter of optocoupler OPTO3, the impedance of the emitter, R_emitter, will be reduced. As a result, the total impedance R_emitter+R5 will be reduced and an output voltage control point will be higher than before. Since the output voltage is going to be higher, the output current will likewise be controlled to a higher value to compensate for the previous smaller I_LED real current value.

When the real current I_LED is greater than the current reference, I_ref, the output voltage of the PI loop in PI loop will decrease such that the current going through diode side of the optocoupler OPTO3 and the resistor R4 will decrease, as well as emitter current. When less current goes through the emitter of optocoupler OPTO3, the impedance of the emitter, R_emitter, will increase. As a result, the total impedance R_emitter+R5 will increase and an output voltage control point will be lower than before. Since output voltage is going to be lower, the output current will also be controlled to a lower value to compensate the previous higher I_LED.

As such, the current control loop may be used to control the output voltage, to regulate the output current, and to still have a maximum output voltage protection directly regulated by the primary side voltage control feedback resistor network. One result of such configuration is that the new comprehensive (or consolidated/combined) control loop is simpler, more cost effective, and has faster voltage control response than what is provided by existing systems, such as that illustrated by FIG. 1.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A driver circuit having a combined current and voltage control circuit for driving a light emitting diode (LED) load, the driver circuit comprising:
   an isolation transformer having a primary winding, a secondary winding, and an auxiliary winding;
   a primary side circuit coupled to the primary winding of the isolation transformer, the primary side circuit having a power factor controller and a switch, the power factor controller configured to control an output current to the LED load by controlling an operational state of the switch;
   a secondary side circuit coupled to the secondary winding, the secondary side circuit having a proportional and integration (PI) control portion configured to output a control signal, the secondary side circuit configured to drive the LED load; and
   the combined voltage and current control circuit coupled to the auxiliary winding, the combined voltage and current control circuit having an optocoupler coupled to the power factor controller and to the PI control section and a voltage feedback resistor group, the voltage feedback resistor group having a first divider formed by a first and a second dividing resistor, and having a second divider formed by the optocoupler and a third dividing resistor,
   wherein the combined voltage and current control circuit is configured to transmit a control signal from the PI control section to the power factor controller, the control signal obtained between the collector of the optocoupler and an intersection between the first and second dividing resistors.

2. The driver circuit of claim 1, wherein the power factor controller comprises a zero-cross detection pin, the zero-cross detection pin coupled to a terminal of the auxiliary winding, the power factor controller configured to control operation of the switch based upon at least one signal received at the zero-cross detection pin.

3. The driver circuit of claim 1, wherein the power factor controller comprises a primary side pin, wherein the optocoupler is coupled to the power factor controller via the primary side pin, and wherein the power factor controller is configured to regulate an output current and an output voltage to the LED load.

4. The driver circuit of claim 1, wherein the optocoupler has an emitter resistance configured to vary between zero resistance and infinite resistance during operation, and wherein the combined voltage and current control circuit is configured to transmit a current control signal to the power factor controller during operation at least in part according to the emitter resistance.

5. The driver circuit of claim 4, wherein the PI control section is configured to compare a sensed current at the secondary side circuit, to compare the sensed current to a reference current, and to provide a corresponding output voltage to the optocoupler.

6. The driver circuit of claim 5, wherein the emitter resistance of the optocoupler is configured to decrease as a current passing through a diode side of the optocoupler increases when the sensed current is less than the reference current, and wherein the power factor controller is configured to increase the output current provided to the LED load responsive to the decreased emitter resistance.

7. The driver circuit of claim 5, wherein the emitter resistance of the optocoupler is configured to increase as a current passing through a diode side of the optocoupler decreases when the sensed current is greater than the reference current, and wherein the power factor controller is configured to decrease the output current provided to the LED load responsive to the increased emitter resistance.

8. The driver circuit of claim 1, wherein the secondary side circuit further includes a current sensing resistor and an operational amplifier, the current sensing resistor coupled to the operational amplifier and configured to sense a real current associated with the secondary side circuit, and the operational amplifier configured to amplify the real current and to provide the amplified real current to the PI control section.

9. A combined current and voltage control circuit coupled to an auxiliary winding of an isolation transformer for providing light emitting diode (LED) driver output control, the combined current and voltage control circuit comprising:
   a diode coupled to the auxiliary winding at an anode thereof;
   a filtering capacitor coupled to a cathode of the diode and to ground;
   an optocoupler having a diode side and a phototransistor side, the optocoupler configured to receive an input control signal at the diode side and to selectively transmit a driver control signal to the phototransistor side; and
   a voltage feedback resistor group coupled to the diode and to the filtering capacitor, the voltage feedback resistor group having a first divider formed by a first and a second dividing resistor, and having a second divider formed by the optocoupler and a third dividing resistor, wherein the combined current and voltage control circuit is configured to output a control signal obtained between the collector of the optocoupler and an intersection between the first and second dividing resistors.

10. The combined current and voltage control circuit of claim 9, wherein the optocoupler has an emitter resistance configured to vary between zero resistance and infinite resistance during operation, and wherein the combined voltage and current control circuit is configured to output a current control signal at least in part according to the emitter resistance.

11. The combined current and voltage control circuit of claim 9, wherein the emitter resistance of the optocoupler is configured to decrease as a current passing through the diode side of the optocoupler increases.

12. The combined current and voltage control circuit of claim 9, wherein the emitter resistance of the optocoupler is configured to increase as a current passing through a diode side of the optocoupler decreases.

13. The combined current and voltage control circuit of claim 9, further comprising:
   a current control section including:
      the optocoupler,
      a primary grounding resistor coupleable to the emitter of the optocoupler at the phototransistor side thereof and to a ground associated with the primary winding, and
      a secondary grounding resistor coupleable to a cathode of the diode side of the optocoupler and to a ground associated with the secondary winding; and
   a voltage control section including:
      the auxiliary winding,
      a zero-cross detection output,
      the auxiliary diode coupled to the auxiliary winding at an anode thereof,
      the filtering capacitor coupled to a cathode of the auxiliary diode and to a ground associated with the primary winding, and
      the first and second dividing resistors.

14. The combined current and voltage control circuit of claim 13, wherein the auxiliary winding is configured to be tightly coupled to the secondary winding such that a voltage across the auxiliary winding matches that across the secondary winding, and wherein the voltage across the auxiliary winding is output by the combined current and voltage control circuit for providing maximum voltage control for an LED driver coupled to the primary wincing.

* * * * *